United States Patent [19]
Giannuzzi et al.

[11] Patent Number: 5,562,377
[45] Date of Patent: Oct. 8, 1996

[54] ANCHOR SLEEVE AND BOLT ASSEMBLY

[76] Inventors: Louis N. Giannuzzi; Anthony C. Giannuzzi, both of 59 Dingletown Rd., Greenwich, Conn. 06830

[21] Appl. No.: 431,507

[22] Filed: Apr. 28, 1995

[51] Int. Cl.$^6$ ..................................................... F16B 13/00
[52] U.S. Cl. ................. 411/82; 52/699; 52/698; 52/745.21; 52/704; 405/259.5; 405/259.6; 411/930; 411/258
[58] Field of Search ............................. 52/698, 699, 704, 52/705, 707, 745.21, 98; 405/259.5, 259.6; 411/82, 258, 930, 14

[56] References Cited

U.S. PATENT DOCUMENTS

| | | | |
|---|---|---|---|
| 4,642,964 | 2/1987 | Kellison | 52/699 |
| 4,652,193 | 3/1987 | Hibbs | 411/82 |
| 4,706,437 | 11/1987 | Boecker | 52/698 |
| 4,836,729 | 6/1989 | Bisping et al. | 405/259.5 X |
| 4,840,524 | 6/1989 | Bisping et al. | 411/82 |
| 5,033,910 | 7/1991 | Wright | 405/259.5 |
| 5,098,227 | 3/1992 | Wright | 405/259.6 |
| 5,263,804 | 11/1993 | Ernst et al. | 411/82 |

FOREIGN PATENT DOCUMENTS

| | | | |
|---|---|---|---|
| 0536820 | of 1955 | Belgium | 405/259.6 |
| 1471763 | 4/1977 | United Kingdom | 52/704 |

*Primary Examiner*—Robert J. Canfield
*Attorney, Agent, or Firm*—Michael Ebert

[57] ABSTRACT

An anchor sleeve and bolt assembly adapted to chemically fasten a fixture or other object having a mounting hole to a masonry body. The assembly compresses a bolt provided with a head engageable by a torque tool and a shank extending from the head, an anchor sleeve threadably received on the shank and extending therefrom to define a void between the end of the shank and the end of the sleeve, and a deformable collar interposed between the head of the bolt and the sleeve. To install the assembly, it is inserted through the fixture mounting hole into a hole drilled in the masonry body whose depth is such that the bolt head then lies adjacent the fixture. Deposited in the drilled hole is a charge of an uncured flowable bonding agent which when the assembly is inserted therein, then spreads into the space between the sleeve and the bank of the drilled hole whereby when the agent is cured and hardened, the sleeve is then chemically anchored in the hole. Should further tightening be required, the bolt is turned by the tool to deform the collar and advance the shank into the void, thereby causing the head of the bolt to press the fixture tightly against the masonry body.

20 Claims, 3 Drawing Sheets

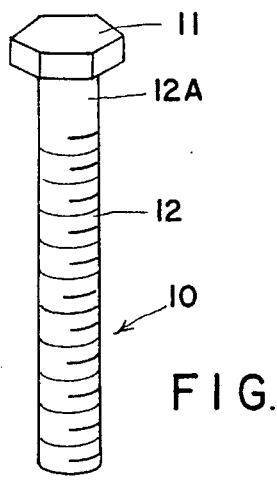
FIG. 1
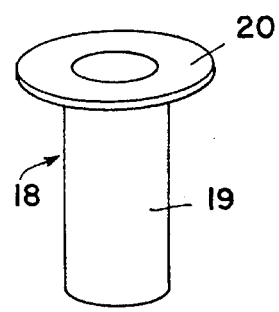
FIG. 2
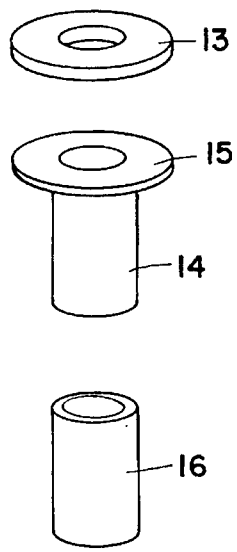
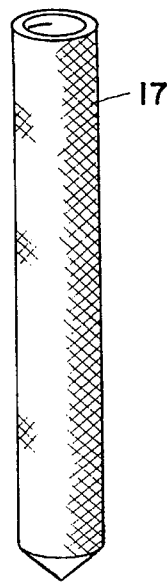
FIG. 3
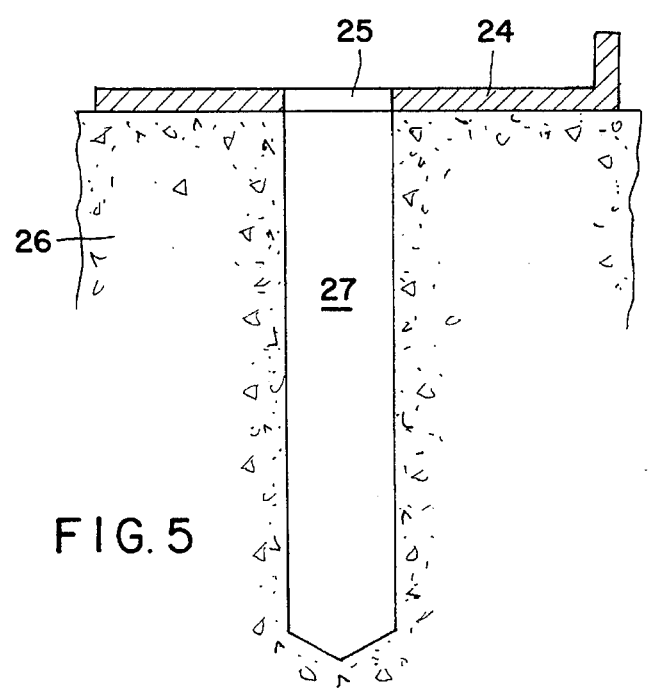
FIG. 5

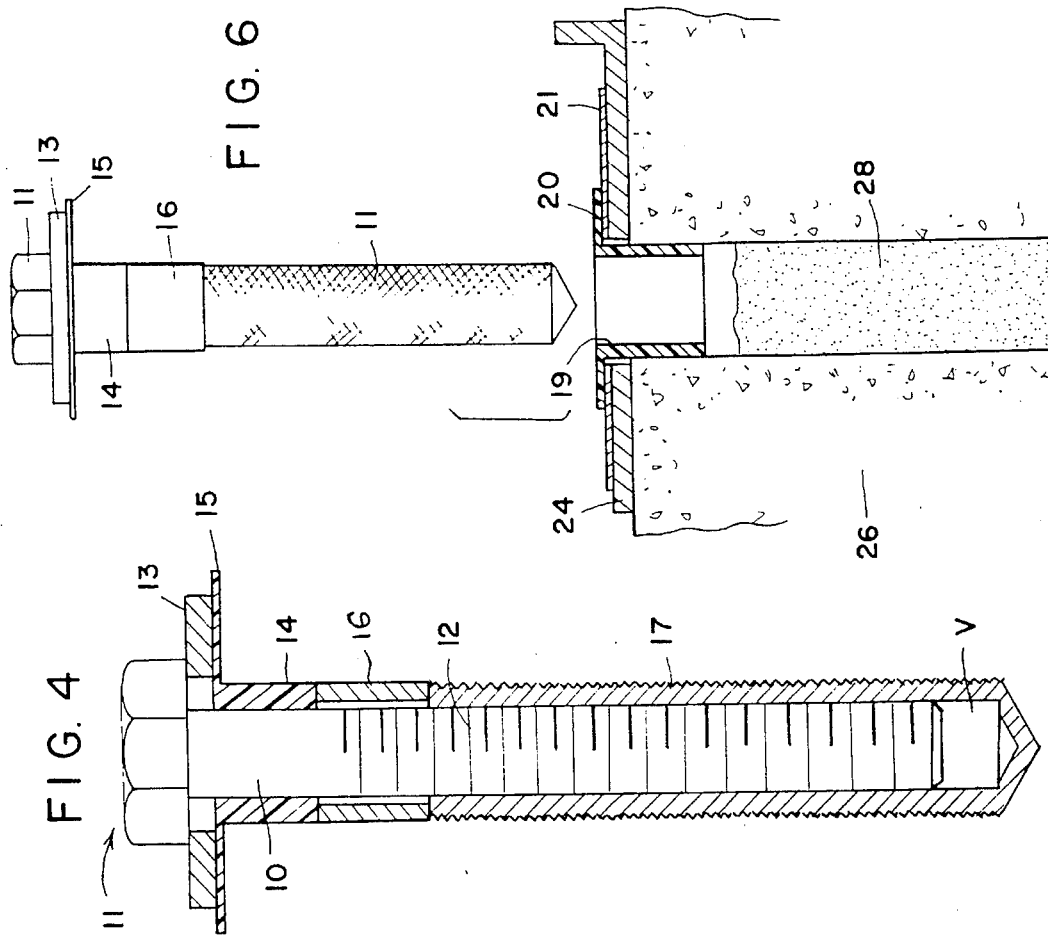

ANCHOR SLEEVE AND BOLT ASSEMBLY

BACKGROUND OF INVENTION

1. Field of Invention

This invention relates generally to chemically-bonded anchors for fastening fixtures and other objects to masonry, and more particularly to an anchor sleeve and bolt assembly having a sleeve threadably received on the shank of the bolt, the assembly being insertable through a mounting hole in the fixture into a hole drilled in the masonry body to cause a charge of an uncured bonding agent deposited in the hole to spread into the space between the bank of the drilled hole and the sleeve whereby when the agent is cured, the sleeve is then anchored in the drilled hole and the fixture is fastened by the bolt to the masonry body.

2. Status of Prior Art

The term masonry refers to a construction of stone or similar material such as concrete and brick. The walls, ceiling and floors of many edifices are formed of masonry. In order, therefore, to fasten fixtures, machines, structural members or other objects to a masonry body, a masonry anchor is required for this purpose.

In the case of concrete or any other form of masonry, one cannot drill a hole therein and then tap this hole so that it can receive an anchor bolt, a threaded stud or other threaded mounting means to secure a fixture or other object to the face of the masonry. The nature of masonry is such that a tapping action to cut female threading into the bank of the hole cannot be effected, for this action will disintegrate the masonry material.

In order, therefore, to anchor a threaded mounting rod or stud in a hole drilled in masonry, the present practice is to use a curable chemical bonding agent for this purpose. The typical agent of this type has two flowable components, one a resinous bonding agent and the other, a hardener therefor. These two components, when stored, must be separated to prevent interaction therebetween. The resins may be phenol, vinyl, ester or epoxy based. Many bonding agents currently available have an accelerated curing time and set within 10 to 30 minutes to afford substantial holding power. The present invention is not concerned with the chemistry of these agents.

When using a typical chemical bonding agent in the drilled hole, a charge of the resinous component and sufficient hardener therefor is deposited in the hole, and a threaded mounting rod is then inserted in the hole and turned therein to intermix the two components of the chemical bonding agent.

When the resinous interfacial layer between the rod and the bank of the hole cures and rigidifies, it then bonds itself both to the rod and to the masonry, so that the rod is permanently anchored in the hole. In order now to secure a fixture to the masonry face, the fixture which has a mounting hole therein is placed over and onto the projecting stud and locked thereto by a washer and nut.

One serious practical drawback to this conventional technique is that should it become later necessary to remove the fixture so that it can be placed at another site on the masonry or for any other reason, one cannot, after withdrawing the fixture then also remove the mounting rod, for this rod is permanently anchored in place. And since the exposed end of the anchored rod projects above the masonry surface, it may interfere with the placement of a fixture at an adjacent site. In any event, this projection is unsightly and, in the case of a floor installation, represents a hazardous obstacle.

In order to provide an adhesive anchor for mounting an object on masonry, the patent to Ernst et al. U.S. Pat. No. 5,263,804 makes use of an internally threaded sleeve on whose upper end is snap-fitted a cap. The sleeve is inserted in a hole drilled in the masonry filled with an adhesive which spreads into the space between the bank of the hole and the sleeve. The cap is provided with a flange that is larger than the hole diameter, so that the sleeve may be seated in the hole at a desired depth. When the adhesive has set and the sleeve anchored, a threaded bolt is then inserted through the cap and turned into the internally-threaded sleeve to fasten an object to the masonry.

The advantage of the Ernst et al. anchor is that it is embedded in the masonry and does not project above as in the case of a chemically-anchored stud. Hence if one wishes to later remove the object from the masonry it is only necessary to unscrew the bolt from the anchor and nothing then remains other than the anchor which is flush with or below the masonry surface.

Disclosed in the Hibbs patent U.S. Pat. No. 4,652,193 is an adhesively secured anchor in the form of an internally-threaded shank having a chisel point. When the Hibbs anchor is driven into a hole drilled in masonry in which there is deposited a capsule containing an epoxy, the capsule is ruptured by the chisel to release the epoxy which then bonds the shank to the bank of the hole.

In order to drive the Hibbs shank, an installation tool is provided which is received in the internally-threaded bore of the shank, the tool being engaged by the chuck of an impact wrench. After the shank is properly anchored in the masonry, the tool is removed. Then in order to fasten a fixture or other object to the masonry, a threaded bolt is used which is inserted through a mounting hole in the fixture and turned into the anchored shank.

The problem with chemically-bonded anchors of the stud type which project above the surface of the masonry as well as with anchors of the type disclosed in the Ernst et al. and Hibbs patents in which the anchors are embedded within the masonry, is that in order to determine where holes are to be drilled in the masonry to accommodate the anchors, one must first put the fixture to be fastened to the masonry at its intended site.

The reason it is necessary to do so, is that the mounting holes in the fixture determine the location of the holes to be drilled in the masonry. After the hole locations are marked, the fixture must be again moved to permit holes to be drilled in the masonry body whose diameter is usually somewhat larger than the mounting holes in the fixture. After drilling a hole in the masonry, an uncured bonding resin is deposited in the drilled hole either by means of a glass capsule or a multi-barrelled cartridge which mixes the two components of the resin before it is deposited in the hole or as it is being deposited.

After the anchor is inserted in the masonry hole and the resin or other adhesive agent is cured and rigidified so that the anchor is then bonded in place, one must now return the fixture to be fastened to its intended site in the masonry body. If the anchor is of the stud type projecting out of the drilled hole, the fixture must be lifted over and onto the projecting stud. To complete the installation, a nut and washer is then received on each stud and the nut is tightened.

In the case of anchors which are embedded in the masonry body and do not project therefrom, it is only necessary to place the fixture so that its mounting holes are aligned with the internally-threaded anchors, and then insert bolts through the mounting holes of the fixture and turn the bolts into the anchors and tighten them to fasten the fixture to the masonry body.

These conventional procedures for fastening a fixture or other object to a masonry body are slow, time-consuming and costly. And where the object to be fastened is heavy and cumbersome as in the case of a large machine, it then becomes very difficult to carry out these known procedures.

One problem faced by the installer of an anchor into a hole drilled in masonry arises from the fact that when the hole has deposited therein a charge of an uncured bonding agent in which is inserted the anchor to be installed, the installer cannot then see into the hole. In order, therefore, to be sure that the charge of bonding agent he has deposited for its intended purpose is adequate, the installer depends on an overflow of the agent from the hole all around the anchor. This overflow indicates to the installer that the uncured bonding agent in the hole is properly spread about the inserted anchor. However, while this overflow of the uncured agent is necessary to a proper anchor installation procedure, it creates other problems, as will be later explained.

Also of background interest is the Kellison patent U.S. Pat. No. 4,642,964 which discloses a fastening system for chemically bonding an anchor in a hole drilled in masonry.

SUMMARY OF INVENTION

In view of the foregoing, the main object of this invention is to provide an anchor sleeve and bolt assembly for quickly and inexpensively fastening a fixture or other object, such as a machine or structural member having mounting holes, to the surface of a masonry body.

More particularly, an object of this invention is to provide an anchor sleeve and bolt assembly and a method for installing this assembly which makes it possible to first place the fixture at a desired site on the surface of the masonry body, then drill through each mounting hole in the fixture a hole in the masonry body, after which a charge of an uncured bonding agent is deposited in the drilled hole and the assembly is inserted therein which, when the agent is cured, acts to fasten the fixture in place.

Also an object of this invention is to provide an anchor sleeve and bolt assembly which includes an anchor sleeve threadably received on the shank of the bolt and a deformable collar interposed between the sleeve and the head whereby after the assembly is installed in the drilled hole and the sleeve is anchored in the drilled hole, the bolt whose head lies against the fixture may be turned to advance further into the sleeve to further tighten the fastening.

Yet another object of this invention is to provide a flanged fixture liner which is inserted into the mounting hole of a fixture placed on the surface of a masonry body and telescopes into the hole drilled therein, whereby when the anchor sleeve and bolt assembly is inserted into the drilled hole which contains a charge of an uncured bonding agent, the fixture liner then prevents an overflow of the bonding agent from going under the fixture and bonding it to the masonry body, and also in conjunction with a paper disc overlying the fixture prevents this overflow from going over and contaminating the fixture in the region surrounding the mounting hole.

Also an object of the invention is to provide an anchor sleeve and bolt assembly in which the sleeve is formed by a tightly wound helix of spring wire which threadably engages the shank of the bolt, the end of the sleeve being plugged by a compressible filler which defines a variable void to permit the advance of the bolt shank to tighten the fastening.

Briefly stated, these objects are accomplished by an anchor sleeve and bolt assembly adapted to chemically fasten a fixture or other object having a mounting hole to a masonry body. The assembly includes a bolt provided with a head engageable by a torque tool and a shank extending from the head, an anchor sleeve threadably received on the shank and extending therefrom to define a void between the end of the shank and the end of the sleeve, and a deformable collar interposed between the head of the bolt and the sleeve.

To install the assembly, it is inserted through the fixture mounting hole into a hole drilled in the masonry body whose depth is such that the bolt head then lies adjacent the fixture. Deposited in the drilled hole is a charge of an uncured flowable bonding agent which when the assembly is inserted therein, then spreads into the space between the sleeve and the bank of the drilled hole whereby when the agent is cured and hardened, the sleeve is then chemically anchored in the hole. Should further tightening be required, the bolt is turned by the tool to deform the collar and advance the shank into the void thereby causing the head of the bolt to press the fixture tightly against the masonry body.

BRIEF DESCRIPTION OF DRAWINGS

For a better understanding of the invention, as well as other objects and features thereof, reference is made to the accompanying drawings wherein:

FIG. 1 is an exploded view of one preferred embodiment of an anchor sleeve and bolt assembly in accordance with the invention;

FIG. 2 illustrates, in perspective, a fixture liner to be used in conjunction with the assembly;

FIG. 3 shows a paper disc for collecting an overflow of the bonding agent when the assembly is inserted in a hole drilled in masonry;

FIG. 4 is a longitudinal section taken through the assembly;

FIG. 5 shows the first step in installing the assembly;

FIG. 6 shows the assembly being inserted through a mounting hole in a fixture placed on the surface of a masonry body into a hole drilled therein;

FIG. 7 shows the installed assembly fastening the fixture to the masonry body;

DETAILED DESCRIPTION OF INVENTION

First Embodiment

Figure 10:
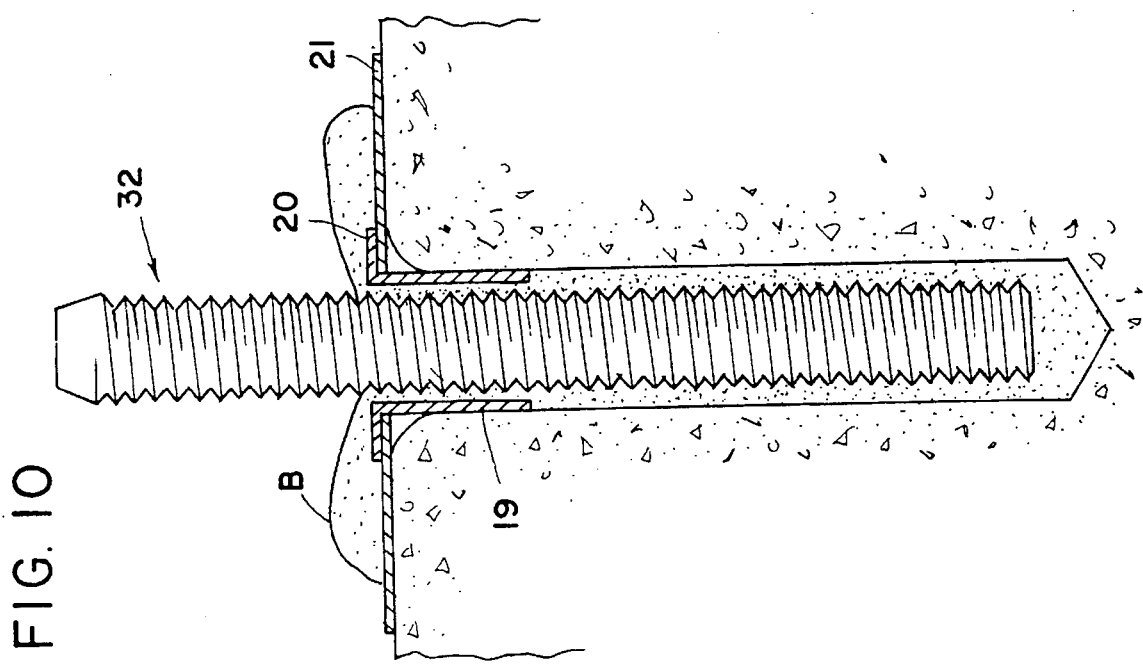
FIG. 10 illustrates another application for the fixture liner and paper disc.

Referring now to FIGS. 1 and 4, an anchor sleeve and assembly in accordance with the invention for fastening a fixture or other object to the surface of a masonry wall or either body, includes a bolt 10, preferably fabricated of steel or other material of high-strength, having an enlarged hexagonal head 11 which is engageable by a wrench or other torque tool, and an elongated shank 12, whose entire length is externally-threaded except for an upper shank zone 12A below head 11.

Received on shank 12 just below the head is a metal washer 13 whose diameter is greater than that of the head, and a deformable collar 14 having a flange 15 at its upper end whose diameter matches that of washer 13 against which the flange abuts.

Deformable collar 14 is preferably made of nylon or other material having similar characteristics so that when the collar is subjected to a compressive force, the collar is then deformed and thereby somewhat shortened in length. Mounted on shank 12 below deformable collar 14 is an extension sleeve 16 formed of steel or other high-strength metal, having the same outer diameter as that of the collar. Neither collar 14 nor extension sleeve 16 is internally threaded; hence these components are slidable on the shank.

Threadably received in the shank below extension sleeve 16 is an internally-threaded anchor sleeve 17 formed of steel or similar material whose front end is closed.

Anchor sleeve 17 has the same outer diameter as extension sleeve 16, but its outer surface is knurled or otherwise roughened to provide a gripping surface for a bonding agent. The length of anchor sleeve is such as to create a void V between the free end of the shank and the closed end of the sleeve.

The dimensions of the anchor sleeve and bolt assembly depend on the nature of the load created by the fixture or other object which is to be fastened to the masonry body. Thus where the bolt required for this purpose is quite long and has a shank of say 3½ inches in length, then instead of having an elongated anchor sleeve of almost the same length as the shank, the assembly includes an extension sleeve, as shown in FIGS. 1 and 4. But for assemblies which have a shorter bolt, one can dispense with an extension sleeve.

But one cannot dispense with the deformable collar, for this is necessary, as will be later explained, to effect tightening of the bolt when the assembly is installed to fasten a fixture to the surface of a masonry body in which a hole has been drilled to accommodated the assembly.

The flanged fixture liner 18 shown in FIG. 2 is molded of nylon, polyethylene or other liquid-impermeable synthetic plastic material to define a cylindrical, thin-walled sleeve 19 whose outer diameter matches the diameter of the drilled masonry hole in which it is to be telescoped, and a circular flange 20 extending outwardly from the upper end of the sleeve having a diameter matching the diameter of flange 15 on collar 14.

As will later be explained, fixture liner 18 cooperates with a paper disc 21 as shown in FIG. 3 whose diameter is much greater than that of the fixture liner flange 20, the disc having a center hole 22 through which the fixture liner is insertable.

Installation Procedure

As shown in FIG. 5, when an anchor sleeve and bolt assembly in accordance with the invention is used to fasten an object, such as a fixture 24 having at least one mounting hole 25 therein, onto the surface of a masonry body 26, the first step in the installation procedure is to place the fixture at a desired site on this body.

When the fixture is in place, the next step is to drill a hole in the masonry body to accommodate the assembly, the drill bit for this purpose having a diameter slightly smaller than the diameter of the mounting hole 25 in the fixture, so that the bit passes through the mounting hole to drill a hole 27 in the masonry. The depth of the drilled hole should somewhat exceed the length of the assembly inserted therein.

Before the bolt assembly is inserted through the mounting hole in the fixture into the hole 27 drilled in the masonry, one deposits, as shown in FIG. 6, a charge of an uncured bonding agent 28 in the drilled hole. The uncured agent may be a flowable mixture of an epoxy resin and a hardener therefor which takes less than a half hour to cure and rigidify. Or it may be any other suitable uncured bonding agent which is flowable in the uncured state and cures and hardens in a relatively brief period.

After the uncured agent is deposited in the drilled hole and before the bolt assembly is inserted therein, placed over fixture 24 is paper disc 21 whose center hole 22 registers with the mounting hole 25. Then inserted in the mounting hole of the fixture and telescoping into the drilled hole in the masonry body is fixture liner 19 whose flange 20 then overlies paper disc 21, as shown in FIG. 6.

The next step is to insert the anchor sleeve and bolt assembly, as shown in FIG. 7, through the mounting hole in the fixture into the hole 27 drilled in the masonry, so that when the assembly is fully inserted, the head 11 of the bolt under which is washer 13 and flange 15 of the deformable collar 14, then overlies flange 20 of the fixture liner.

The insertion of the assembly into the drilled hole which is partially filled with an uncured bonding agent in a flowable state, causes this agent to spread into the annular space between the anchor sleeve of the assembly and the circular bank of somewhat greater diameter of the drilled hole. The uncured agent, if the amount deposited is adequate, will force its way upwardly between the interior of the fixture liner 19 and the extension sleeve 16 and the deformable collar 14, and overflow out of the drilled hole. As a consequence, as shown in FIG. 7, the excess agent resulting from the overflow will be extruded from between the upper flange 20 of the liner and the upper flange 15 of the deformable collar onto paper disc 21 to form thereon a blob B. When this blob hardens, it is a simple matter to dispose of it by tearing the paper disc off the fixture.

As pointed out in the Background section, it is important that the installer of the anchor assembly deposit a charge of the uncured bonding agent into the hole drilled in masonry which when spread about the assembly effects full bonding thereof. Otherwise, the holding power of the anchorage will be more or less reduced, depending on the extent to which the amount of agent falls short of full coverage. Since the installer, once the anchor assembly is inserted, cannot then see into the drilled hole, to ensure an adequate charge, its amount must be sufficient to cause the uncured agent to overflow from the drilled hole all around the anchor assembly, for this overflow indicates a full spread of the agent about the assembly in the hole. In a proper installation, the installer must, therefore, cope with the excess bonding agent overflowing from the drilled hole so that it produces no adverse effects.

It is important to note that fixture liner 18, inserted through the mounting hole of the fixture, telescopes into the drilled masonry hole to bear against the bank thereof. This acts to block entry into the interface between the fixture and the masonry surface. Hence no excess bonding agent can enter this interface and thereby bond the fixture to the masonry. Such bonding is undesireable, for then it would be difficult, when necessary to do so, to remove the fixture (or other object) from the masonry.

The excess bonding agent is collected on the paper disc 21, and after the agent cures and hardens to form a solid blob B, the disc is then torn away. Hence the outer surface of the fixture is kept clean and is not contaminated by the agent. Ideally, the amount of uncured bonding agent deposited into the drilled hole should be the exact amount necessary to effect full bonding of the anchor sleeve to the bank of the hole. But since in practice it is difficult to control the exact amount of the deposit, in some instances the amount may fall short of that necessary to bond the entire anchor sleeve to the bank of the hole. In practice therefore, it is important, that the amount of the deposit be sufficient to result in an overflow out of the drilled masonry hole all around the anchor assembly, for this indicates that the amount is adequate to effect full bonding.

Equally important is for the installer to be able to perform the entire installation procedure without the bonding agent, which is very difficult to clean, making contact with his hands or his tools. When the bonding agent is cured, the installation is completed, for the anchor sleeve is now permanently anchored in the drilled hole in the masonry, and the bolt received in the sleeve engages the fixture to hold it in place in the masonry. It may, however, be desireable to press the fixture more tightly against the masonry, and to this end one has only to turn the bolt with a torque tool to cause deformable collar 14 to deform and thereby permit the shank of the bolt to advance into void V and thereby tighten the fastening.

Should one wish to later withdraw the fixture from the masonry, the bolts of the assemblies inserted in the mounting holes are turned out of the anchor sleeves and removed to free the fixture. Since the anchor sleeves remain embedded in the masonry holes, they do not project therefrom and do not interfere with the movement of objects on the surface of the masonry.

Thus an anchor sleeve and bolt assembly in accordance with the invention makes it possible to fasten a fixture or other object to a masonry body once the fixture has been placed at a desired site on the masonry surface without the need to shift the fixture in order to drill holes in the masonry.

Second Embodiment

Figure 8:
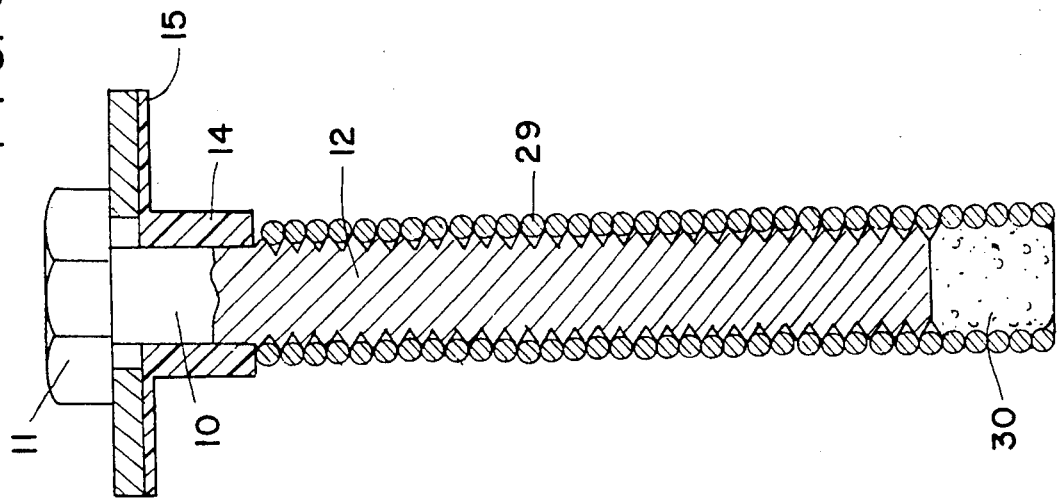
FIG. 8 is a longitudinal section taken through a second embodiment of an assembly in accordance with the invention in which the anchor sleeve is formed by a spring wire helix.

In the embodiment of an anchor sleeve and bolt assembly shown in FIG. 8, the assembly includes a bolt 10 having a head 11 and an externally-threaded shank 12 as in the first embodiment. But instead of a solid metal anchor sleeve and an extension sleeve, as in the first embodiment, the anchor sleeve 29 in the second embodiment is formed by a tightly wound helix of spring wire, preferably steel, whose pitch and diameter are such as to match the external helical threading on the shank of the bolt. Hence the wire spring helix functions as an internally-threaded cylindrical sleeve. The length of the helix is such that it extends beyond the end of shank 12 to provide a void that is occupied by a plug 30 of compressible material, such as flexible plastic foam, the plug closing the sleeve.

Plug 30 serves two purposes, for it not only closes the end of the helix and thereby prevents uncured bonding agent from flowing into the end of the helix when the assembly is inserted in a hole drilled in the masonry partially filled with this agent, but it also serves to create a variable void.

Thus after the agent hardens, the compressible plug permits the bolt to advance into the void to tighten the fastening, as in the first embodiment, for when the bolt is advanced, the deformable collar 14 is then deformed and the plug is then compressed to permit this advance.

Because the spring wire helix is preferably tightly wound, it is effectively impermeable to the uncured bonding agent. However, should some of this agent penetrate the abutting convolutions of the spring wire helix and make contact with the threaded surface of the bolt shank, the shank will then bond to the helix and it will not be possible to turn the bolt. To avoid this possibility, the bolt shank surface may be coated with a release agent, such as a lubricant, grease, or paint to prevent the shank from adhering to the bonding agent.

In the spring wire helix shown in FIG. 8, the wire has a circular cross section; hence the interstices between the convolutions of the wire which form the internal thread of the anchor sleeve, have the geometry of a V whose inclined sides are curved.

Figure 9:
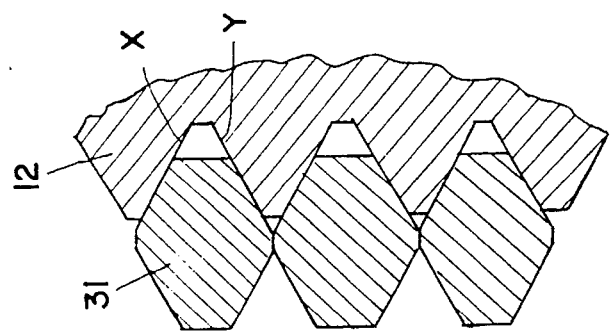
FIG. 9 is an alternative form of helix.

It is desirable, in some instances, to bring about a better match between the geometry of the external threading of the bolt shank and the internal threading created by a tightly-wound wire helix forming the anchor sleeve. As shown in FIG. 9, the external threading of shank 12 of the bolt has a V-shaped geometry whose converging inclined sides X and Y are straight.

To match this geometry, the abutting convolutions 31 of the tightly wound helical spring forming the anchor sleeve are formed of a wire having a hexagonal cross section whose inclined set of sides on the interior of the helix fit into and match the corresponding straight sides of the shank threading. Hence when this helix is threadably received on the bolt shank, the convolutions of the helix are not spread apart as the bolt is screwed into the helix, but remain in abutting relation.

Other Applications

In the first and second embodiments of an anchor sleeve and bolt assembly in accordance with the invention, fixture liner 19 inserted into the mounting hole of the fixture and telescoping into the drilled hole so that it bears against its bank serves to direct excess uncured bonding agent onto a paper disc surrounding the mounting hole.

The combination of fixture liner and paper disc is also useful for other types of masonry anchors, such as the threaded stud type 32 shown in FIG. 10 which is inserted into a hole drilled in a masonry body 33 partially filled with an uncured bonding agent. The stud projects from the hole so as to go through the mounting hole of a fixture placed over and onto the stud after the stud has been chemically anchored.

Before stud 32 is inserted into the hole, placed over the hole in alignment therewith is paper disc 21, and then placed over the paper disc is the flange 20 of the liner 19 which is telescoped in the hole to line its surface at the upper end thereof.

Hence when stud 32 is pushed into the drilled hole and immersed in the uncured bonding agent which partially fills the hole, the agent spreads into the space between the stud and the bank of the hole. Excess agent is forced through the interior of hole liner 19 onto its flange 20, and from there onto paper disc 21 where it forms a blob B that when the agent is cured and rigidified can be torn off.

In a stud anchor installation, overflow bonding agent represents a problem, for it settles in the region surrounding the projecting stud and if not removed, it then becomes impossible to mount a fixture on the stud so that it lies against the masonry and is not raised thereabove by a blob of bonding agent.

Removal of the overflow while it is uncured is a difficult and messy task, moreover, no matter how this is done there is a residue left on the masonry surface which may be highly undesirable should it be necessary at a later date to move the fixture.

While there have been shown and described preferred embodiments of an anchor assembly in accordance with the invention, it will be appreciated that many changes may be made thereon within the spirit of the invention. Thus instead of a circular paper disc to collect the excess bonding agent one may use a non-circular mat of paper or other tearable material for this purpose, the mat having a center opening aligned with the drilled hole containing a charge of the bonding agent.

We claim:

1. An anchor sleeve and bolt assembly for chemically fastening a fixture or other object having a mounting hole to a masonry body, said assembly being insertable through the mounting hole into a hole drilled in the masonry body, the drilled hole having a bank, said assembly comprising:

A. a bolt having a head and a shank extending therefrom, said head being engageable by a torque tool;

B. an anchor sleeve threadably received on the shank and extending therefrom to define a void between the end of the shank and the end of the sleeve; and C. a deformable collar mounted on the shank interposed between the head of the bolt and the sleeve, said sleeve and said collar having dimensions which render the assembly insertable in toto through said fixture mounting hole into said drilled hole, deformation of the collar permitting the bolt to advance relative to the sleeve whereby when the hole is drilled into the masonry body to accept the assembly, and an uncured flowable bonding agent is then deposited in the hole after which the assembly in toto is inserted therein to cause the agent to rise between the sleeve and the bank of the hole, the agent which thereafter causes the fixture to become fastened to the masonry by the assembly, and should further tightening be desirable, the bolt is then turnable by the tool to deform the collar and thereby advance the shank into the void, the bolt then pressing the fixture more tightly against the masonry body, said sleeve and said collar received on the shank having a form effectively shielding said shank from said uncured agent whereby said agent makes no contact with said shank and the shank is free to turn.

2. An assembly as set forth in claim 1, in which the deformable collar is provided at its upper end with a flange.

3. An assembly as set forth in claim 1, in which the collar is formed of nylon.

4. An assembly as set forth in claim 2, further including an extension sleeve interposed between said collar and said anchor sleeve.

5. An assembly as set forth in claim 1, wherein said anchor sleeve is formed by an internally-threaded cylindrical metal sleeve having a closed end and said shank is externally threaded to receive said sleeve.

6. An assembly as set forth in claim 1, in which said anchor sleeve and said bolt are both made of steel.

7. An assembly as set forth in claim 1, in which said anchor sleeve is formed of a helix wound of spring wire.

8. An assembly as set forth in claim 7, having a plug of compressible material closing an end of the helix.

9. An assembly as set forth in claim 7, in which the wire has a circular cross section.

10. An assembly as set forth in claim 7, in which the wire has a hexagonal cross section.

11. An anchor sleeve and bolt assembly for chemically fastening a fixture or other object having a mounting hole to a masonry body, said assembly which is insertable in toto into a hole drilled in the body through the mounting hole comprising a bolt having a head and a shank extending therefrom, and a cylindrical sleeve threadably received on said shank having a diameter smaller than that of the mounting hole and effectively shielding said shank from a bonding agent whereby when the assembly is inserted in toto through the mounting hole into a hole having a bank drilled in the masonry body, said drilled hole having deposited therein a charge of an uncured bonding agent which when the assembly is inserted in the drilled hole rises upwardly along the bank of hole around the sleeve without making contact with said shank, and when thereafter the agent is cured to chemically anchor the sleeve in the drilled hole, the fixture is then fastened by the bolt to the masonry body.

12. An assembly as set forth in claim 11, further including a fixture liner adapted to be inserted into the mounting hole of the fixture and to telescope into an upper zone of the drilled hole in the masonry to bear against the bank of the hole and thereby shield said mounting hole and said zone from said bonding agent.

13. An assembly as set forth in claim 12, in which the liner is provided at its upper end with a flange that is adapted to overlie the fixture and when the uncured bonding agent rises upwardly along the bank of the hole directs excess bonding agent outwardly.

14. An assembly as set forth in claim 13, further including a mat having a center hole adapted to be mounted over the mounting hole of the fixture under the flange of the liner which directs the excess bonding agent outwardly onto the mat to collect the excess bonding agent.

15. An assembly as set forth in claim 14, in which said mat is a paper disc.

16. A method for fastening a fixture or other object having a mounting hole to a masonry body by means of a non-expandable type anchor sleeve and bolt assembly that includes a bolt provided with a head and a shank extending therefrom and a sleeve threadably received on the shank which effectively shields the shank of the bolt from a bonding agent, comprising the steps of:

A. placing the fixture on the masonry body at a desired site thereon at which the fixture is to be fastened to the body;

B. drilling a hole in the body through said mounting hole having a depth sufficient to accept said assembly to produce a drilled hole having a bank;

C. depositing a charge of an uncured bonding agent in said drilled hole; and

D. inserting said non-expandable type assembly through said mounting hole into said drilled hole so that the head of the bolt then lies adjacent the fixture to cause said agent to spread into the space between said sleeve and the bank of the drilled hole, said sleeve effectively shielding the shank from said bonding agent whereby when the agent is cured, the sleeve is then chemically anchored in the hole and the bolt whose head lies adjacent the fixture acts to fasten the fixture to the masonry body.

17. A method as set forth in claim 16, wherein the deposit is in an amount causing the uncured bonding agent to overflow said hole around the assembly inserted therein.

18. A method as set forth in claim 17, further including the step of inserting in the mounting hole of the fixture placed on the masonry body, a fixture liner which telescopes into the drilled hole in the body and bears against the bank of the drilled hole to prevent the agent from entering an interface between the fixture and the masonry body.

19. A method as set forth in claim 18, further including the step of placing over the mounting hole a removable disc having an opening therein in alignment with the mounting hole to collect excess bonding agent coming out of the mounting hole when the assembly is inserted therein.

20. A method as set forth in claim 18, further including the step of placing over the mounting hole a tearable mat having an opening therein in line with the mounting hole to collect excess uncured bonding agent coming out of the mounting hole when the assembly is inserted therein.

* * * * *